United States Patent [19]
Truppi et al.

[11] Patent Number: 5,770,165
[45] Date of Patent: Jun. 23, 1998

[54] REGENERATIVE THERMAL OXIDIZER WITH FLOOR-MOUNTED MEDIA SUPPORT

[75] Inventors: Thomas James Truppi, Corona; Erwin Hendricks, LaVerne; Gary Lee Martin, Upland; Melanius D'Souza, San Dimas, all of Calif.

[73] Assignee: Smith Engineering Company, Ontario, Calif.

[21] Appl. No.: 648,752

[22] Filed: May 17, 1996

[51] Int. Cl.$^6$ ............................ B01D 50/00; F27D 17/00
[52] U.S. Cl. ....................... 422/171; 422/175; 422/221; 422/223; 110/244; 432/181
[58] Field of Search ................... 110/244; 165/9.3; 432/180, 181, 182; 422/171, 175, 221, 223

[56] References Cited

U.S. PATENT DOCUMENTS

| | | | |
|---|---|---|---|
| 2,718,460 | 9/1955 | Bowen, III | 422/221 |
| 4,470,806 | 9/1984 | Greco | 432/182 |
| 5,026,277 | 6/1991 | York | 432/181 |
| 5,134,945 | 8/1992 | Reimlinger et al. | 110/304 |
| 5,221,522 | 6/1993 | Cash | 422/171 |
| 5,262,130 | 11/1993 | Kissel et al. | 422/311 |
| 5,262,131 | 11/1993 | Bayer et al. | 422/175 |
| 5,352,115 | 10/1994 | Klobucar | 432/181 |

*Primary Examiner*—Nina Bhat
*Attorney, Agent, or Firm*—Niro, Scavone, Haller & Niro

[57] ABSTRACT

An improved structural support system for a regenerator used with a regenerative thermal oxidizer, including a perforated and corrugated rigid beam resting on a support surface. The perforated beam supports heat exchange materials either directly, or indirectly using a perforated grid. The beam includes a plurality of perforations permitting upward gas flow from the underside of the beam and through the heat exchange materials. The air distribution plenums under the beam are reduced in height from that of conventional systems. The novel structure results in a more reliable and efficient regenerator.

17 Claims, 3 Drawing Sheets

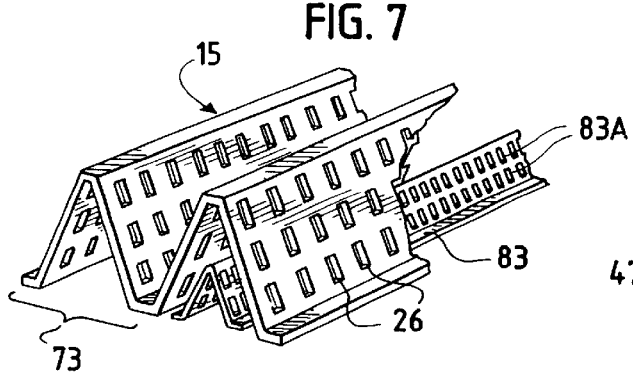
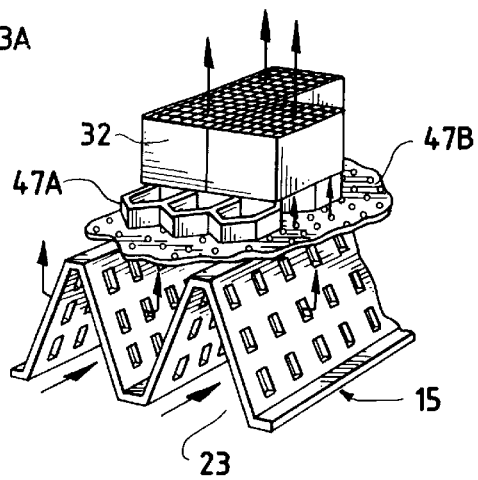
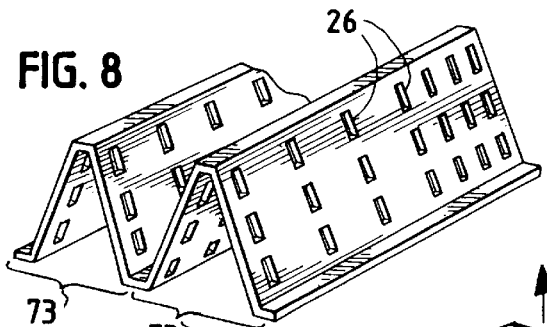
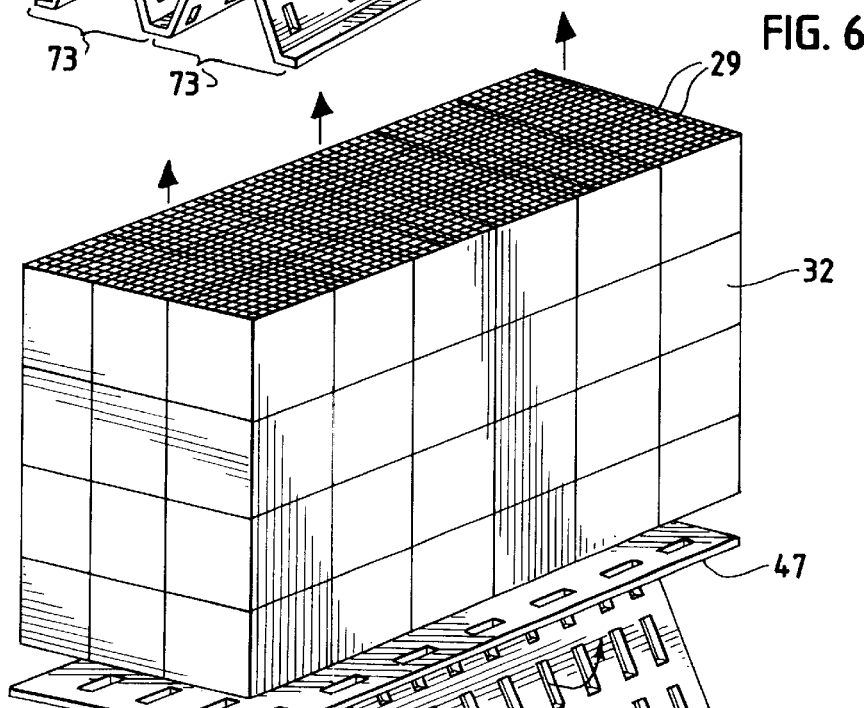
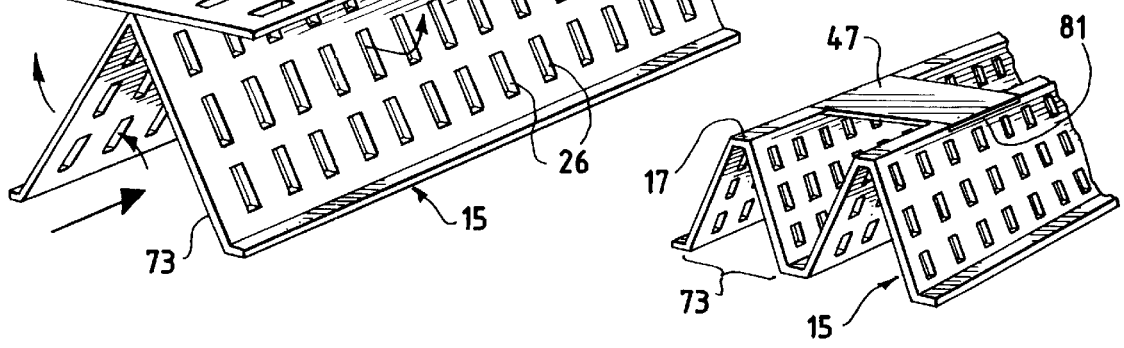

REGENERATIVE THERMAL OXIDIZER WITH FLOOR-MOUNTED MEDIA SUPPORT

BACKGROUND OF THE INVENTION

The present invention generally relates to a regenerative thermal oxider (RTO) with heat exchangers leading to a common combustion chamber. More specifically, the invention relates to an RTO employing a novel means of supporting the heat exchanger media, which provides corresponding advantages.

RTOs are known for oxidizing pollutants, such as hydrocarbon vapors in air. In a conventional "reverse flow" RTO, a pollutant-laden "dirty" gas to be cleaned is directed into a combustion chamber to be oxidized and burned (typically at temperatures in excess of 1500° F.); the oxidized gas is then directed out of the combustion chamber and through a "cooling" (previously heated) second regenerative heat exchanger. By alternating the flow of cool gas to be cleaned through a hot heat exchanger, and moving the hot cleaned gas from the combustion chamber and through a "cooled" heat exchanger, an RTO can continuously operate to efficiently oxidize pollutant-laden gases.

Typical RTOs employ media within the heat exchangers, such as saddle (random-packed) or ceramic (structured) media (compare U.S. Pat. No. 5,026,277, incorporated herein by reference, with U.S. Pat. No. 5,352,115) for extracting heat from the hot processed effluent gases which can be used to preheat incoming gas. The heat exchange media weighs many thousands of pounds (media weighing 50,000–60,000 pounds per individual heat exchanger is typical, with the media in any one heat exchanger weighing as much as 100,000 pounds, given the can size) and has been conventionally supported by a beam spanning an air distribution plenum (see "Prior Art" drawings, FIGS. 1 and 2), such as a steel beam fabricated from a perforated plate. As shown in FIG. 2, media beam "B" is supported by reinforcing steel "R" and spans the width of air distribution plenum "P" to support heat exchange media "M". Inlet and outlet ports 22A and 22B are provided to distribute air through heat exchange regenerator 10.

The conventional design shown in FIGS. 1 and 2 is expensive and is prone to failure, particularly when the support structure is exposed to high temperatures in an upset or non-standard condition. Situations in which non-standard conditions can occur include when the RTO controls fail to detect a high temperature, when the damper valves do not switch when they should, or when liquid condenses out of the duct work and burns; each of these situations can raise the beam temperature to a point for which the suspended beam may not be designed. With such conventional support systems the suspended media beam can bend, crack or fail altogether, permitting the heat exchange media to fall into the air distribution plenum, and preventing further use of the RTO.

It would therefore be advantageous to provide a more reliable and inexpensive RTO in which the individual heat exchangers do not employ a beam for supporting the heat exchange media which spans the air distribution plenum. It would also be desirable for economical reasons to provide a support structure for the heat exchange media which does not require the use of separate structure to support the media beam. Further, it would be advantageous to provide such a system that could be used with heat exchangers employing either random-packed or structured heat exchange media.

SUMMARY OF THE INVENTION

These and other advantages are provided by the present invention, which also preserves the advantages of conventional RTO structures used to support the heat exchange media. In addition, the present invention provides new advantages not found in such currently available equipment, and overcomes many of the disadvantages of such equipment.

The invention is generally directed to a support structure for heat exchange materials contained within an individual regenerator associated with a regenerative thermal oxidizer. The regenerator rests on a support surface. The support structure within the regenerator preferably includes a corrugated, perforated beam made of a rigid material. The perforated beam has a configuration defining, together with the base surface, a plurality of air distribution plenums located under the corrugated beam. The beam rests on the support surface and supports the heat exchange materials. While in a particularly preferred embodiment, the beam is generally V-shaped in cross-section, the beam can have a variety of geometries, including generally square, rectangular or circular cross-sections. To enhance air flow distribution, the spacing between perforations along the beam length can be varied, thereby creating a non-uniform array of perforations. In an alternative embodiment, one or more channels can be provided under the beam; the channels can also have a predetermined, non-uniform array of aperatures to enhance gas flow distribution.

In use, a gas such as air flows from outside the regenerator and into an inlet in fluid communication with the underside of the floor-mounted beam. The gas flows upwardly from the air distribution plenums and through the beam perforations, and then upwardly through the heat exchange materials. The support structure of the present invention can be used with either random-packed or structured heat exchange media (such as ceramic blocks having parallel gas flow passages).

In an alternative embodiment, a support grid can be used with the perforated, floor-mounted media beam, to facilitate load transfer between the media and the beam, while also permitting adequate gas flow distribution. The grid can take many forms, such as a flat perforated plate, a perforated plate with honeycomb-shaped sections, and other forms. Alternatively, the grid can placed or interlocked within the media beam sections.

Use of the present invention permits the employment of one or more air distribution plenums having a reduced height as compared to conventional systems. This height reduction can be as much as 100% or more. Accordingly, using the support structure of the present invention, the height of the heat exchange materials may be as much as two or three times or more than that of the plenum height.

Viewed in another way, the present invention provides a reduced plenum volume which correspondingly reduces the volume of untreated gases exhausted from the plenum (defined here as the "entrained plenum volume") sent to the environment during a valve switch, when using an RTO employing an even number of regenerators. The ratio between the entrained plenum volume and the volumetric capacity of a regenerator made according to the present invention is less than about 2%, and can be less than about 1%, whereas this same ratio for conventional regenerators is typically greater than about 2%.

BRIEF DESCRIPTION OF THE DRAWINGS

The novel features which are characteristic of the present invention are set forth in the appended claims. The invention itself, however, together with further objects and attendant advantages, will be best understood by reference to the following description taken in connection with the accompanying drawings in which:

FIG. 5 is a partial perspective view of an alternative embodiment of the present invention employing a honeycomb-shaped grid for use with structured media;

FIG. 6 is a partial, enlarged perspective view of an alternative embodiment employing a flat perforated grid for use with structured media;

FIG. 7 is a partial perspective view, in partial cross-section, of an alternative embodiment of the media beam of the present invention using a perforated air distribution channel;

FIG. 8 is a partial perspective view of yet another alternative embodiment of the media beam of the present invention;

FIG. 9 is an alternative grid-beam arrangement for the present invention;

DETAILED DESCRIPTION OF THE PREFERRED EMBODIMENTS

Figure 1:
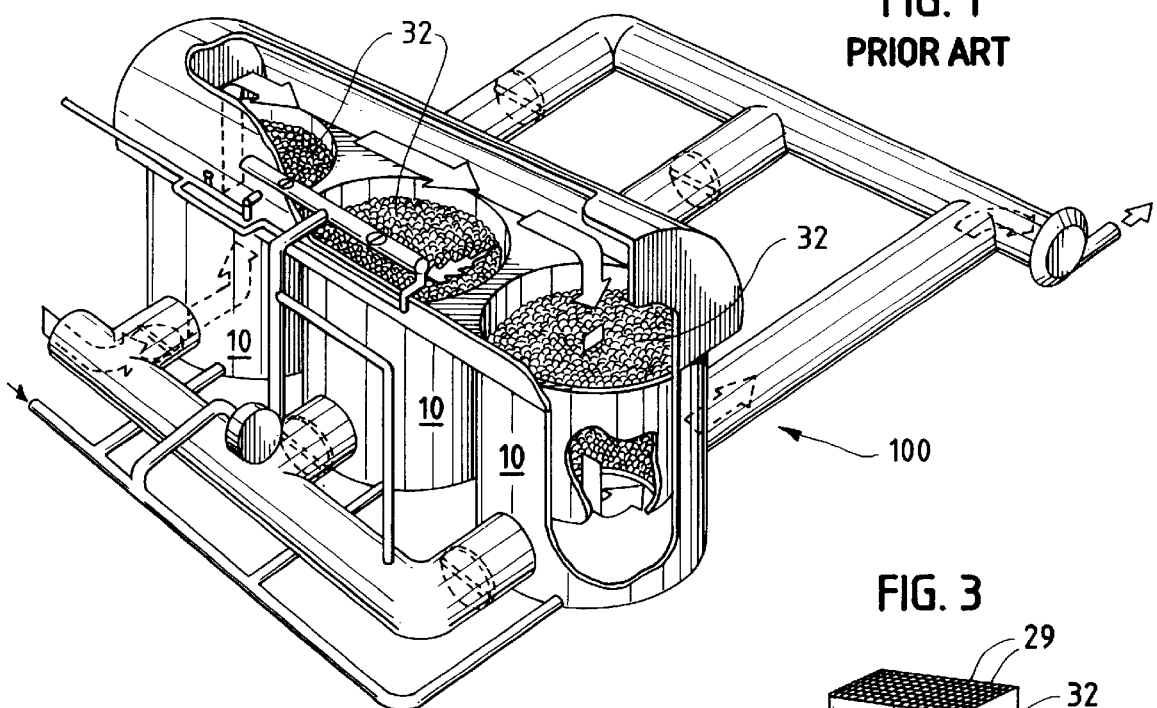
FIG. 1 is a perspective view of the assignee's own prior art RTO "3-can" system, employing three heat exchangers and a negative purge system, as disclosed in U.S. Pat. No. 5,026,277.
Figure 3:
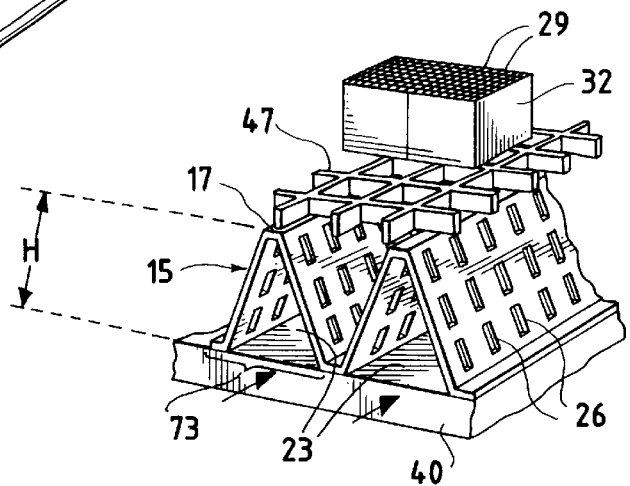
FIG. 3 is a partial perspective view of one embodiment of the heat exchange media support structure of the present invention for use with structured media.
Figure 2:
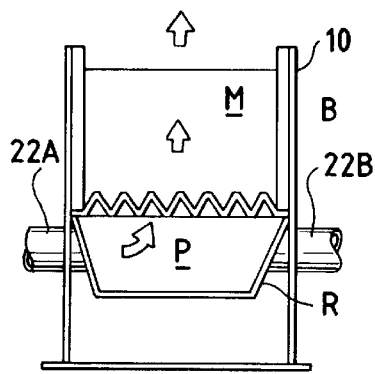
FIG. 2 is a side cross-sectional view of a conventional regenerator employing a media beam that spans the width of the air distribution plenum.

Referring now to FIG. 3, a portion of a heat exchanger or "regenerator" 10 for use in an RTO, designated generally as 100, employs the heat exchange media support structure of the present invention. A perforated, corrugated media beam 15 rests on, and is supported by, an inert floor structure designed to support the weight of the entire heat exchanger, such as a transportable support skid. Pollutant-laden air to be cleaned flows in through the side gaps 23 in media beam 15, as shown by the direction of the arrows parallel to the beam length "l" (see FIG. 4). The dirty air then flows upward through beam perforations 26 and through the individual gas flow passages 29 within structured heat exchange media 32.

FIG. 3 discloses a portion of a heat exchanger employing structured media, such as ceramic bricks 32, having parallel gas flow passages 29. Preferably, a grid, such as steel grid 47, rests on peaks 17 of beam 15 and supports media 32. Alternatively, a honeycomb-shaped grid 47A sitting on perforated plate 47B (shown in FIG. 5), a simple perforated plate, or a grid with perforations of a different geometry could be used. Preferably, a grid is used which permits sufficient air flow distribution from the underside of media beam 15 and through media 32, while also providing sufficient strength to safely transmit the media load to beam peaks 17.

Referring back to FIG. 3, dirty air to be cleaned can be directed from an area outside the regenerator and through a poppet valve, a series of butterfly valves, or other expedient structure (not shown), and then through side gaps 23 in beam 15 to media 32. Beam 15 rests directly on a suitable floor surface, such as a support skid or cast refractory floor 40. The floor surface is preferably flat to evenly distribute the media load over the width of the perforated beam.

Figure 4:
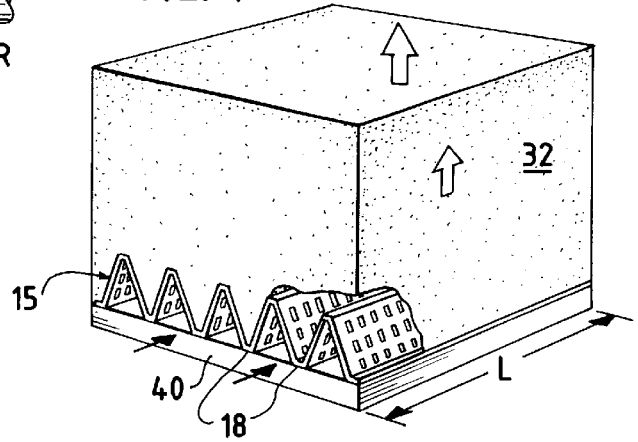
FIG. 4 is a perspective view, in partial cross-section, of a second embodiment of the heat exchange media support structure of the present invention for use with random-packed refractory media or "saddle"

FIG. 4 discloses an alternative embodiment of the present invention in which heat exchanger 10 employs random-packed refractory material 32 as the heat exchange media. No grid structure is necessary with this embodiment. Again, a V-shaped or sinusoidal-shaped perforated beam 15 is preferably used to support heat exchange media 32. Beam 15 is supported at valleys 18 by floor 40. Random-packed media 32 can be poured into the heat exchanger hopper, falling onto the upper surface of media beam 15, and filling the valleys 18 between beam peaks 17.

It will be appreciated that the individual beam sections 73 form side gaps 23 which are individual air distribution plenums with a reduced height "H" (see FIG. 3) as compared to air distribution plenums in conventional regenerators. As an example, one 30,000 cubic feet/minute (CFM), 2-can RTO with a bed cross-sectional area of 150 square feet (e.g. 10 feet long×15 feet wide) and a beam length of 10 feet, required a heat exchange media bed height of 8 feet to achieve 94.5% heat recovery efficiency. This system, with the floor-mounted media beam of the present invention, included air distribution plenums having a height of about 18–20 inches, whereas the same system using the conventional suspended media beam employed an air distribution plenum with a height of about four feet. Thus, since for the same system recovery efficiency requirements, the cross-sectional area or "footprint" of the air distribution plenum does not change (rather, only the plenum height changes), the Hb/Hp ratio (height of media bed versus height of plenum) in this example varies between about 2 for a conventional system and about 4 for a system of the present invention. Further, since Q=VA (where Q is the air flow in CFM, V is the air velocity and A is the cross-sectional area or footprint of the bed/plenum) while the height of the heat exchange media bed is a function of the heat recovery efficiency of the system, the required air velocity, given a particular footprint, is a function of the plenum height. Thus, for a given beam length "L" and plenum height "H", L/H might be L/4 for a conventional system and L/2 for a regenerator employing the support structure and configuration of the present invention.

The reduced plenum height made possible by the floor-mounted media beam construction of the present invention decreases the "entrained plenum volume," defined here as the untreated plenum volume exhausted during valve switches. Using the 30,000 CFM example given above, with a footprint of 150 feet squared and a plenum height of about two feet, the plenum of the present invention has a volume of 300 cubic feet. Thus, the ratio of the entrained plenum volume to the unit capacity is 300/30,000 or 1%. With a conventional design, however, using a four-foot tall plenum, the plenum volume is 600 cubic feet, and this ratio is 2%, and can be greater than that.

Referring now to the several alternative embodiments of the invention shown in FIGS. 7 and 8, air distribution using the support structure of the present invention can be enhanced, as follows. Air flowing into an individual heat exchanger will have a tendency to move straight up through media beam 15 after flowing horizontally through only a portion of the beam length. To correct this problem and provide better air distribution along the length of media beam 15, a second, smaller V-shaped channel 83 (for example) can be provided within individual V-shaped beam sections 73, as shown in FIG. 7. Channel 83 need only have perforations 83A located along the far one-third (for example) of the beam length, to force more air to flow to the rear of the regenerator. Alternatively, as shown in FIG. 8, the perforation density can be increased along the beam length to accomplish this same purposes.

Figure 10:
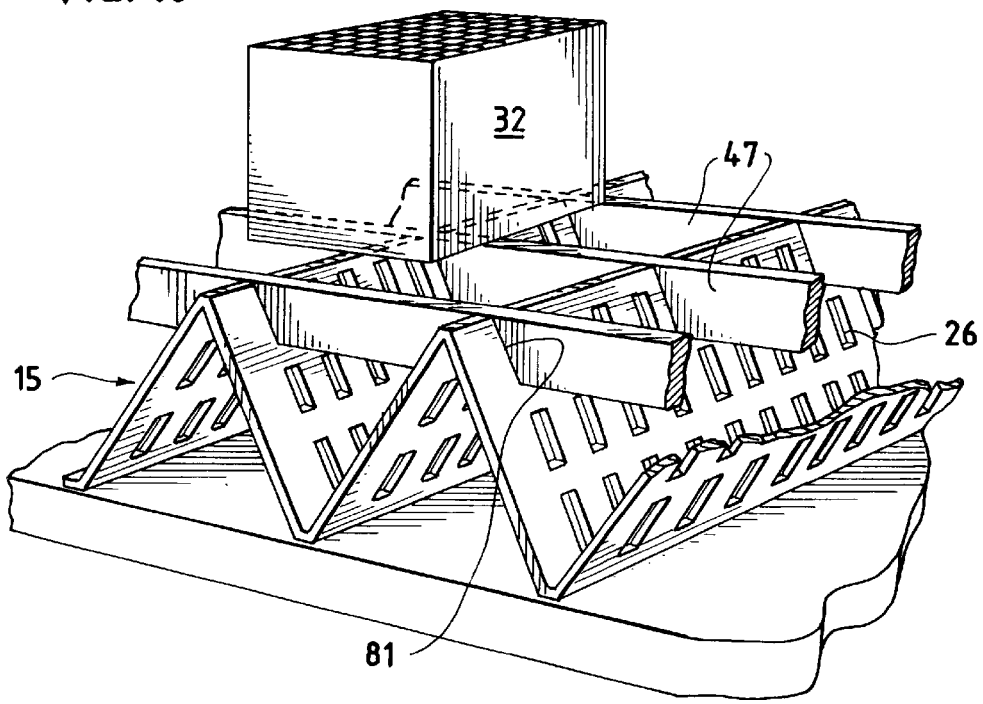
FIG. 10 is yet another alternative grid-beam arrangement for the present invention.

Another alternative embodiment of the invention is shown in FIG. 9. Flat support grid portions 47, for example, are incorporated into the individual V-shaped media beam sections 73 of beam 15 by setting grid portions 47 into slots 81 cut into adjacent individual peaks 17 of beam sections 73. Alternatively, as shown in FIG. 10, the grid could consist of rectangular beams 47 running along the width of the regenerator, and fitting within slots 81.

To take a specific example, the embodiment shown in FIG. 6 might conventionally employ structured media 32 with a height of seven feet, a length of eleven feet, and a width of two feet. Individual sections 73 of media beam 15 could be two feet high and wide (including their peak-to-peak distance), with a corresponding length of eleven feet, and with spaced perforations 26 as shown. Stainless steel grid spacer 47 could be two inches thick. Air flow is in the direction of the arrows, as shown.

Figure 11:
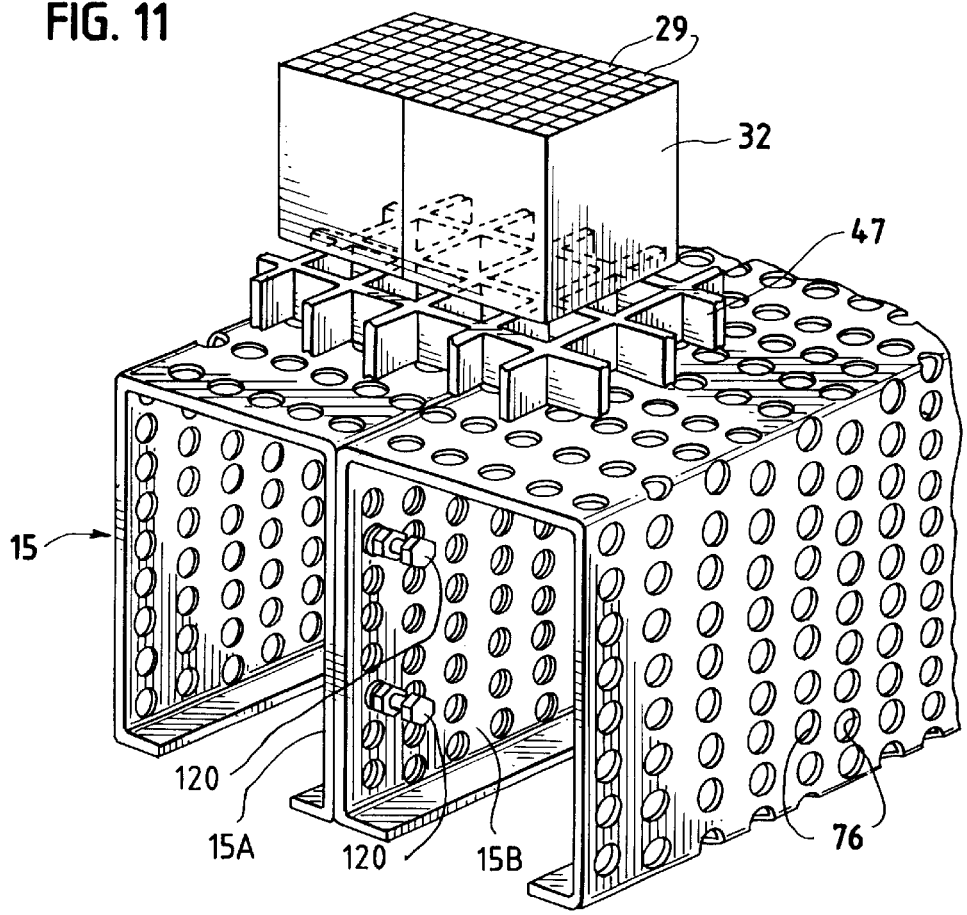
FIG. 11 is a partial enlarged perspective view of a support structure for used with structured media employing a media beam with a rectangular cross-section.

In an alternative embodiment shown in FIG. 11, media beam 15 has a rectangular geometry. Adjacent vertical sides 11A and 15B of the beam can be bolted together using bolts 120. This embodiment requires the use of more beam material than the V-shaped beam embodiment, and it may also be more difficult to channel flow in the direction of the beam length, due to the greater cross-sectional sectional area of the perforated beam. Finally, it may also be difficult to align the holes on common sides of the beam with this embodiment. In alternative embodiments, the media beam may be V-shaped or sinusoidal-shaped; the beam can also be rectangular or circular in cross-section, or can be configured in other geometric shapes, provided that the beam possesses sufficient strength and the underside of the beam permits the use of an adequately-sized air distribution plenum.

The grid resting on beam peaks 17 can be fabricated from a mild steel or, alternatively, any other alloy possessing the requisite high-temperature-resistant and corrosion-resistant characteristics and also possessing sufficient strength to support the weight of random-packed or structured heat exchange media.

The present invention provides several advantages over conventional systems for supporting heat exchange media in an RTO regenerator. For example, it eliminates the use of suspended media beams. Since the load of the heat exchanger media is not suspended over the plenum, a smaller steel beam can be used.

Another advantage of the present invention is that because the media beam rests on the floor, the media load is evenly transmitted to the floor or support skid. This also eliminates the need for structural steel (for example) required to support the media beam itself.

A further important advantage is that, because access to the underside of the media beam is no longer required, the size of the lower plenum can be reduced to a minimum (consistent with the flow requirements of the system). In addition to conserving space, this volume reduction decreases the negative impact on the destruction efficiency of an RTO with an even number of heat exchangers, since during a valve switch, the volume of untreated air leaving the system will be decreased. Similarly, with an RTO employing a purge system with an odd number of cans, the purge volume (and, therefore, the purge flow rate in the RTO) is correspondingly reduced, in turn reducing the size of the motor, fans and/or blowers used for purging.

The elimination of suspended media beams will also prevent distortion of the beams when the individual heat exchanger is in an over-heated condition due to the diminished load bearing capacity, at elevated temperatures, of the material that the beams are constructed from.

It will be understood that the invention may be embodied in other specific forms without departing from its spirit or central characteristics. The present examples and embodiments, therefore, are to be considered in all respects as illustrative and not restrictive, and the invention is not to be limited to the details given here.

We claim:

1. Support structure in combination with a thermal oxidizer, comprising:
   a regenerative thermal oxidizer with a regenerator, the regenerator resting on a base surface and containing heat exchange materials;
   a perforated, corrugated beam made of a rigid material, the beam having a configuration defining, together with the base surface, a plurality of air distribution plenums located under the beam; and
   wherein the beam rests on the base surface and supports the heat exchange materials.

2. The regenerative thermal oxidizer of claim 1, wherein the heat exchange materials are in the form of a structured heat exchange media having parallel gas flow passages, and the structured heat exchange media rests on the beam.

3. The regenerative thermal oxidizer of claim 2, wherein the structured media is comprised of ceramic blocks having parallel gas flow passages.

4. The regenerative thermal oxidizer of claim 1, wherein the heat exchange materials are in the form of a structured heat exchange media, and further comprising a grid supporting the structured heat exchange media and resting on the perforated beam.

5. The regenerative thermal oxidizer of claim 4, wherein a portion of the grid includes honeycomb-shaped sections.

6. The regenerative thermal oxidizer of claim 1, further comprising a grid for transferring the load of the heat exchange media to the perforated beam.

7. The regenerative thermal oxidizer of claim 6, wherein the grid is interlocked into portions of the perforated beam.

8. The regenerative thermal oxidizer of claim 1, wherein the perforated beam is formed of generally V-shaped sections.

9. The regenerative thermal oxidizer of claim 8, wherein at least some of the generally V-shaped sections of the perforated beam house a smaller channel, one or more of the smaller channels having perforations along only a portion of its length.

10. The regenerative thermal oxidizer of claim 1, wherein the heat exchange materials are packed in a random fashion and rest on top of the perforated beam.

11. The regenerative thermal oxidizer of claim 1, wherein the perforated beam is rectangular in cross-section.

12. The regenerative thermal oxidizer of claim 1, wherein the regenerative thermal oxidizer utilizes a negative purge system.

13. The regenerative thermal oxidizer of claim 1, wherein the spacing between perforations along the beam length varies, thereby creating a non-uniform array of perforations.

14. Support structure in combination with a thermal oxidizer, comprising:
   a regenerative thermal oxidizer with a regenerator, the regenerator having a predetermined volumetric capacity and resting on a base surface, the regenerator also permitting the periodic flow of a gas therethrough;

a perforated, corrugated beam made of a rigid material, the beam having a configuration defining, together with the base surface, a plurality of air distribution plenums located under the beam;

the beam resting on the base surface and supporting the heat exchange materials;

the one or more air distribution plenums being in fluid communication with a regenerator inlet permitting gas to flow from outside the regenerator and into the plurality of air distribution plenums, the plurality of air distribution plenums together having an entrained plenum volume; and wherein the ratio between the entrained plenum volume and the volumetric capacity of the regenerator is less than about 2%.

15. Support structure in combination with a thermal oxidizer, comprising:

a regenerative thermal oxidizer with a regenerator, the regenerator resting on a base surface and containing heat exchange materials;

a rigid beam including a plurality of perforations and having upper and lower support surfaces, the lower support surface of the beam resting on the base surface and the upper support surface of the beam supporting the heat exchange materials;

wherein the beam has a configuration defining, together with the base surface, a plurality of air distribution plenums located under the beam, the plurality of air distribution plenums being in fluid communication with an inlet permitting gas to flow from outside the regenerator and into the air distribution plenums, and wherein the height of the heat exchange materials is more than twice the height of the air distribution plenum.

16. Support structure in combination with a thermal oxidizer, comprising:

a regenerative thermal oxidizer with a regenerator, the regenerator resting on a base surface and containing heat exchange materials;

a perforated, corrugated beam made of a rigid material, the beam having a configuration defining, together with the base surface, a plurality of air distribution plenums located under the beam; and wherein the beam rests on the base surface and supports the heat exchange materials, and the spacing between perforations along the beam length varies, thereby creating a non-uniform array of perforations.

17. The support structure in combination with a thermal oxidizer of claim 1, wherein a gas flowing outside the regenerator and into an inlet in fluid communication with the plurality of air distribution plenums flows upwardly through the beam perforations, and then upwardly through the heat exchange materials.

* * * * *